United States Patent Office 2,838,061
Patented June 10, 1958

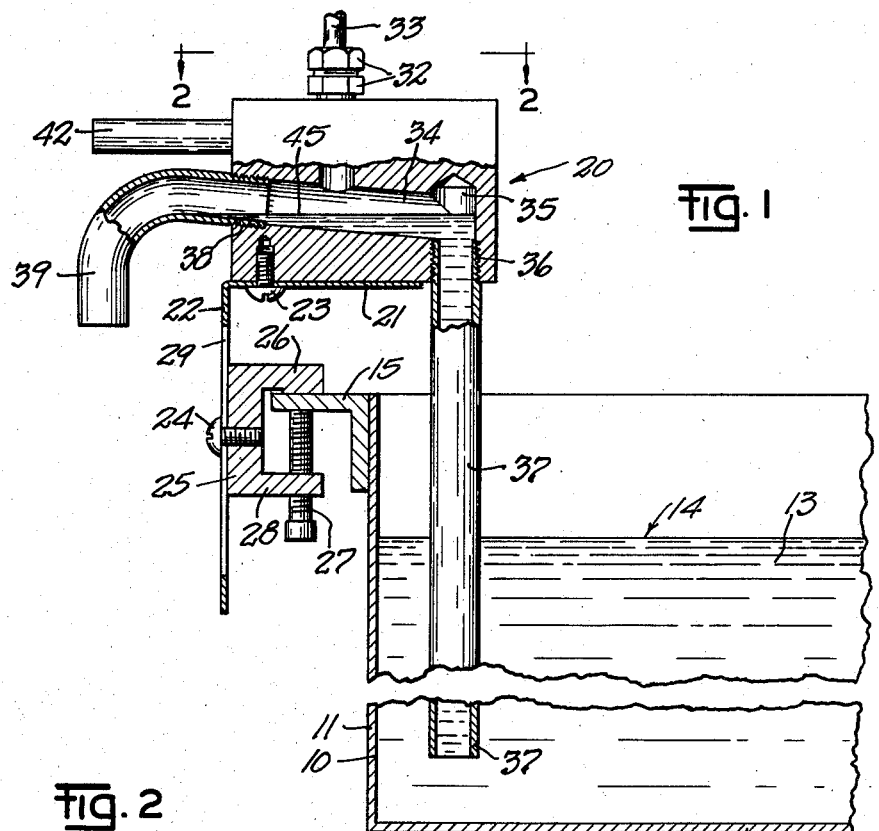
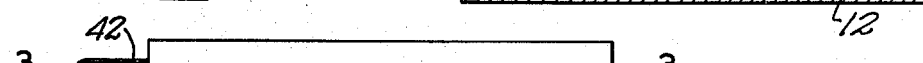
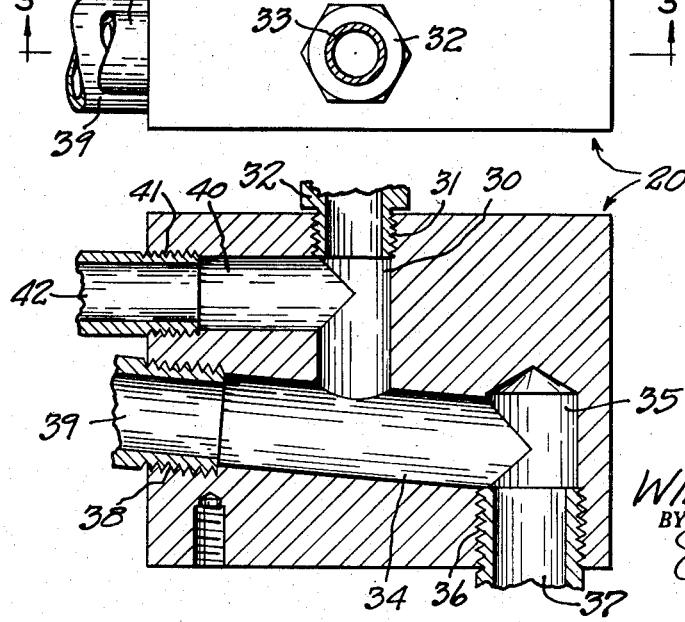

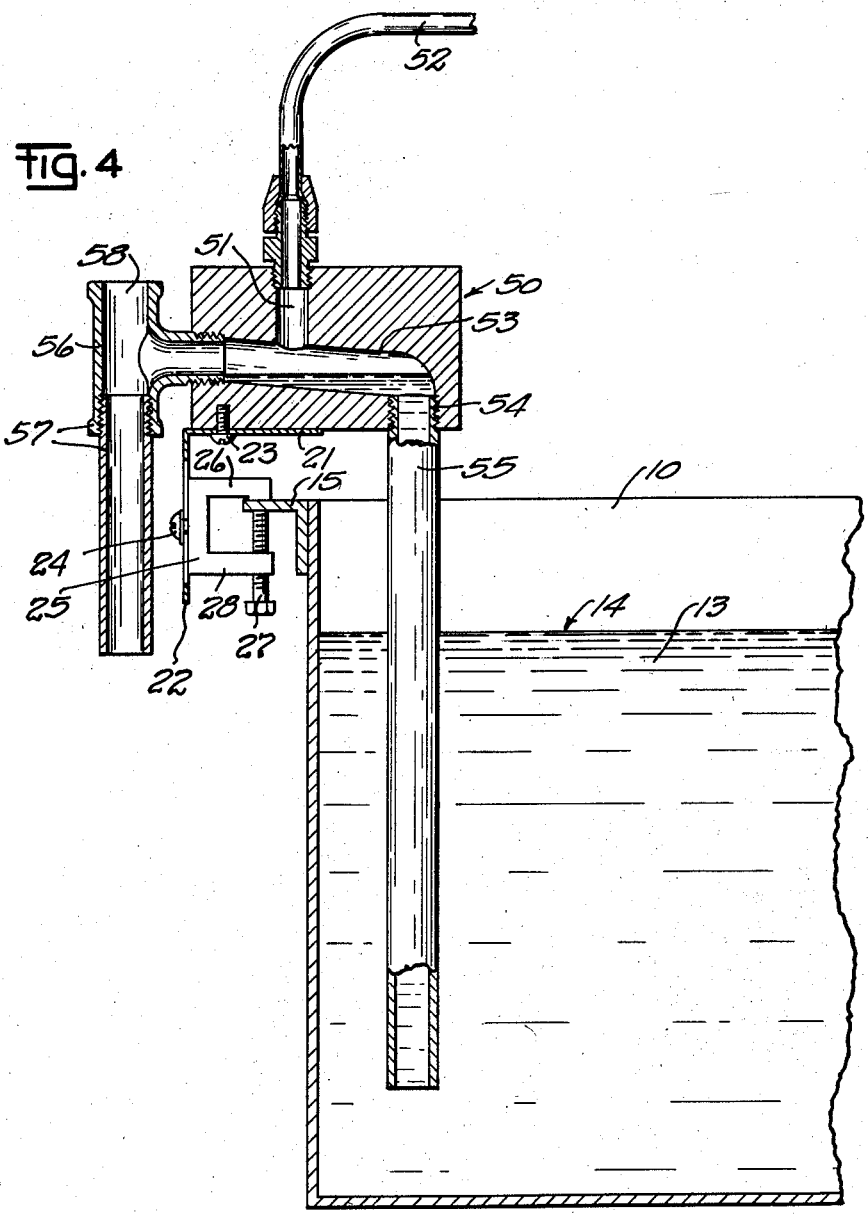

2,838,061

LIQUID LEVEL CONTROL DEVICE

Wilbur F. Stump, Elkhart, Ind.

Application July 26, 1956, Serial No. 600,286

7 Claims. (Cl. 137—154)

This invention relates to improvements in liquid level control devices, and more particularly to devices for controlling the level of a mixture of water and a liquid having a greater specific gravity than water, and from which mixture water evaporates progressively.

The primary object of this invention is to provide a novel, simple and inexpensive construction which will permit the constant addition of water to a mixture of water and another liquid of greater specific gravity, so that the level of the liquid mixture within a container therefor remains substantially constant at all times.

A further object is to provide a device of this character accommodating automatically the delivery into a container of a quantity of water from a constantly flowing stream of water sufficient to maintain constant in the container the liquid level of a liquid mixture of greater specific gravity than water, and wherein the excess of water supplied above that required to maintain said level is discharged without danger of syphoning of the liquid mixture from the container.

Other objects will be apparent from the following specification.

In the drawing:

Fig. 1 is a view of the device in side elevation as applied to a container, with parts shown in cross-section;

Fig. 2 is a top plan view of the device;

Fig. 3 is a vertical sectional view taken on line 3—3 of Fig. 2; and

Fig. 4 is a vertical sectional view similar to Fig. 3 and illustrating a modified embodiment of the invention mounted on a tank.

Referring to the drawing, and particularly to Figs. 1 to 3, the numeral 10 designates a tank or container having side walls 11 and a bottom 12 and containing a liquid 13 whose level at 14 in the container is to be maintained substantially constant. The liquid in this case will be a mixture of water and a liquid having a specific gravity greater than water. One example of such a liquid is an electro-plating solution, and the tank or container 10 may be a conventional electroplating tank. The tank will preferably have an outwardly projecting rim or support portion 15 at its upper end secured thereto in any suitable manner and providing a support for bracket means mounting the level control device.

As here shown, the level control device 20 is supported upon the horizontal part 21 of a bracket having an upright part 22, and is preferably secured to part 21 by securing means, such as a screw 23. The upright portion 22 of the bracket is secured by any suitable means, such as the screw 24, to a clamp or other attachment means 25. As here shown, the clamp 25 is substantially of C-shape, having a substantially horizontal or laterally projecting part 26 adapted to bear against the tank rim part 15 and pressed into firm frictional engagement with tank rim 15 by a screw 27 threaded in a laterally projecting leg 28 of the clamp body 25. The attachment means so shown is optional, and any other attachment means found suitable may be employed. The upright 22 preferably has an elongated slot 29 therein receiving the securing member 24 to provide vertical adjustment of the position of the level control device 20 with reference to the upper edge of the tank 10 and the liquid level 14 therein.

The level control device 20 preferably comprises a block of metal, plastic or any other suitable material, having a vertical passage 30 therein open at its top and preferably screw-threaded at 31 to receive a fitting 32 for connection of a water conduit 33 therewith. The passage 30 will terminate spaced above the bottom of the block or body and in communication with a transversely extending passage 34 which preferably is disposed at an angle slightly displaced from 90 degrees relative to the passage 30, so that the axis of the passage 34 will normally be inclined relative to the horizontal, as illustrated in Fig. 3. The passage 34 communicates with a vertical passage 35 at one end thereof, here shown as the lower end, which passage 35 extends downwardly and opens at the bottom face of the body 20. Passage 35 preferably has a screw-threaded end portion 36 accommodating screw-threaded connection of an elongated conduit 37 adapted to extend into the tank 10 to a position below the liquid level 14 and preferably slightly above the bottom of the tank 12. Passage 35 is preferably laterally offset from the passage 30, as shown in Fig. 3. The passage 34 will extend from the vertical passage 35 to the side of the body 20 remote from the passage 35, so that the vertical passage 30 will be positioned intermediate the length of the passage 34. The open end 38 of the passage 34 is preferably screw-threaded for connection of an elbow 39 thereto with its free end depending therefrom to drain liquid from the passage 34 to a position spaced laterally and clear of the tank 10. A passage 40 preferably branches from passage 30 spaced above the passage 34 and is open to atmosphere at a level above passage 34 and elbow 39. The end portion 41 of passage 40 is preferably screw-threaded and may detachably mount an air vent conduit 42. In this connection it will be understood that the screw-threading of portion 41 and the mounting of the air vent tube 42 may be dispensed with, if desired.

The device is mounted upon the tank 10 in the manner illustrated in Fig. 1, with conduit 33 connected to the source of water, and the conduit 37 projecting into the tank and open at its bottom end. The level at which the device 20 is located will be such that a hydrostatic balance occurs between the liquid mixture 13 in the tank and a column of water standing in the conduit 37 and the bores 34 and 35 to the level 45 which constitutes the overflow level of passage 34. A constant supply of water is fed to the device through the conduit 33 which passes into and through the passage 30 into the cross-passage 34. The rate at which water is supplied will preferably exceed the rate at which water from the mixture 13 evaporates, and the excess wil be drained constantly through the outlet elbow or drain 39. Whenever evaporation of water from a solution 13 occurs with resultant lowering of the liquid level 14, the water in the upper part of the conduit 37 and in the passages 34, 35 will automatically replenish the water content of mixture 13 and restore the level of the liquid within tank 10 to the level 14. It is possible by a construction of this character to control the level quite accurately and within a range of variation less than one-half inch with respect to the level 14.

No danger of the occurrence of any syphoning action in the device tending to syphon the solution 13 from the tank 10 through the outlet 39 exists. Such syphoning action is prevented by virtue of the vent passage 40 communicating with passage 34 and open to atmosphere and located at a level substantially above the level of the cross-passage 34. Thus, even though a constant discharge of or overflow of water through the outlet 39 occurs incident to supply of more water than is needed to maintain a hydrostatic balance between the liquid mixture 13 in the tank 10 and the liquid column in the conduit 37 and the passages 34 and 35, that hydrostatic balance is not overcome or disturbed by the flow of water out of the outlet 39 by reason of the fact that the vent is open to atmosphere and prevents the commencement of any syphoning action. With reference to the hydrostatic pressure balance, it will be evident that, when the level 14 lowers in the tank, the hydrostatic pressure in the tank will reduce slightly relative to the hydrostatic pressure in the filled conduit 37 and the cross-passage 34 which produces flow of water from conduit 37 into the tank until the hydrostatic balance is reestablished.

Referring to Fig. 4, which illustrates a modified embodiment of the invention, the body of the control device 50 is mounted in any suitable manner at proper elevation to provide a hydrostatic balance as above described. Body 50 is provided with a substantially vertical inlet passage 51 connected by a conduit 52 to a source of water. A cross-passage 53 is formed in the body 50, being preferably inclined with its lower portion communicating with a downwardly extending passage 54 to which is connected a depending conduit 55 which extends into the tank 10 to a point below the level 14 of the solution 13 therein. The high level end of the inclined passage 53 has a T-fitting 56 connected thereto, said T-fitting having a downwardly projecting drain portion 57 and an upwardly projecting vent portion 58.

The construction illustrated in Fig. 4 is adjustable vertically relative to the tank 10 to locate the high point of the inclined cross-passage 53 thereof substantially at a level representing the point of hydrostatic balance between the water in the conduit 55 and the solution 13 in the tank 10, as in the preferred embodiment. Thus as water is constantly supplied through conduit 52, the portion thereof in excess of that required to maintain the constant level 14 in the tank 10 overflows through the depending portion 57 of the T-fitting 56. Air entering through the portion 58 of the T-fitting vents the device and prevents the occurrence of any syphoning action.

While the preferred embodiments of the invention have been illustrated and described, it will be understood that changes in the construction may be made within the scope of the appended claims without departing from the spirit of the invention.

I claim:

1. A liquid lever control device for adding water to a container to maintain substantially constant therein the level of a mixture consisting of water and a liquid of greater specific gravity than water, comprising a member having a liquid passage therethrough, adjustable means for supporting said member on said container at a selected elevation, means supplying water to said passage, a discharge conduit communicating with said passage and depending from said member and projecting into said container and immersed in said mixture, said passage having an outlet above said container for draining clear of said container water from said supply means in excess of the amount required to maintain the desired mixture level in said container, the top of said passage having a vent to atmosphere between said supply means and said outlet.

2. A liquid level control device as defined in claim 1, wherein said drain outlet includes a portion inclined slightly upwardly and outwardly from said passage, said supporting means positioning said member at an elevation to maintain the highest point of the inclined passage at the level at which the head of water in said passage balances the head of the mixture in said container.

3. A liquid level control device as defined in claim 1, wherein said vent extends upwardly from the outer end portion of said drain outlet.

4. A liquid level control device adapted for use on a tank containing a mixture of water and a liquid having a specific gravity greater than water, comprising a member having an inlet passage, a transverse passage and a discharge passage communicating with each other, an adjustable support carried by said tank for mounting said member at a selected elevation above the level of the mixture in said tank, a conduit communicating with said discharge passage and projecting into said tank and immersed in said mixture, drain means communicating with said transverse passage for draining water overflowing from said transverse passage to a point clear of said tank, and air vent means communicating with said transverse passage and open to atmosphere at a level above the overflow level of liquid in said transverse passage.

5. A liquid level control device as defined in claim 4, wherein said vent means constitutes a passage in said member communicating with said inlet passage.

6. A liquid level control device as defined in claim 4, wherein said air vent means constitutes an opening in the upper part of said drain means clear of said member.

7. A liquid level control device as defined in claim 4, wherein said transverse passage is inclined upwardly from said discharge passage and wherein said inlet passage communicates with said transverse passage at a level above the overflow level in said transverse passage.

No references cited.